Patented Aug. 18, 1925.

1,550,420

UNITED STATES PATENT OFFICE.

LOUIS BENDA, OF MAINKUR, NEAR FRANKFORT-ON-THE-MAIN, GERMANY, ASSIGNOR TO LEOPOLD CASSELLA & CO. GESELLSCHAFT MIT BESCHRÄNKTER HAFTUNG, A CORPORATION OF GERMANY.

OIL-AND-FAT-SOLUBLE ACRIDINIUM SALTS.

No Drawing.   Application filed July 14, 1921. Serial No. 484,784.

*To all whom it may concern:*

Be it known that I, LOUIS BENDA, a subject of the Swiss Republic, residing at Mainkur, near Frankfort-on-the-Main, Germany, have invented Oil-and-Fat-Soluble Acridinium Salts, of which the following is a full description.

The salts of acridinium compounds hitherto known have the disadvantage of being insoluble in oils and fats, which for many purposes in dermatology renders them difficult to apply. Also for subcutaneous and intraperitoneal application the known acridinium salts cannot be recommended, owing to the irritation caused by the aqueous solutions of these salts.

It has now been found that these water-soluble, mineral-acid salts, by interaction with salts of such fatty acids which are contained in the natural fats, produce the respective fatty acid acridinium salts and that the latter, whilst being soluble in oils, are insoluble in water and do not show any of the drawbacks peculiar to the above-mentioned mineral-acid salts.

Example: 15 kilos sodium salt of stearic acid are dissolved in 500 liters hot water. When cooled down to 35° C., a solution of 9 kilos 3.6-diamino-10-methylacridinium-chloride in 225 liters is gradually added whilst stirring, stirring being continued for another ½ hour.

The orange-coloured precipitate is then filtered, washed well with cold water and dried on the water-bath, whereby the elevated temperature will cause same to assume a pasty character.

In its dry state the new compound, at normal temperature, forms an orange-coloured powder which, in contradistinction to the original material, is insoluble in water, but yields a clear solution in oils. Instead of 3.6-diamino-10-methylacridiniumchloride other salts of acridinium with mineral acids may be used; the sodium stearate may be substituted by other salts of fatty acids. The products thus obtained possess similar properties.

Having now particularly described and ascertained the nature of my said invention and in what manner the same is to be performed, I declare, that what I claim is:

1. As new substances the products obtained by interaction of mineral acid salts of a 3.6-diamino-10-alkylacridinium compound with salts of such fatty acids which are contained in the natural fats,—the substances being in the dry state orange-red colored powders, insoluble in water but soluble in fatty oils and alcohol.

2. As new substances the products obtained by interaction of mineral acid salts of a 3.6-diamino-10-alkylacridinium compound with salts of stearic acid; the substances being in the dry state orange-red colored powders, insoluble in water but soluble in fatty oils and alcohol.

3. As new substances the products obtained by interaction of mineral acid salts of 2.7-dimethyl-3.6-diamino-10-alkylacridinium compounds with salts of stearic acid, the substances being in the dry state orange-red colored powders, insoluble in water but soluble in fatty oils and alcohol.

In witness whereof I have hereunto signed my name this 16th day of June 1921.

DR. LOUIS BENDA.